United States Patent
Mack

(10) Patent No.: US 9,303,648 B2
(45) Date of Patent: Apr. 5, 2016

(54) COMPLIANT RADIAL BEARING FOR ELECTRICAL SUBMERSIBLE PUMP

(71) Applicant: Baker Hughes Incorporated, Houston, TX (US)

(72) Inventor: John J. Mack, Catoosa, OK (US)

(73) Assignee: Baker Hughes Incorporated, Houston, TX (US)

( * ) Notice: Subject to any disclaimer, the term of this patent is extended or adjusted under 35 U.S.C. 154(b) by 308 days.

(21) Appl. No.: 13/932,616

(22) Filed: Jul. 1, 2013

(65) Prior Publication Data

US 2015/0004031 A1     Jan. 1, 2015

(51) Int. Cl.
| F04D 13/10 | (2006.01) |
| F04D 29/047 | (2006.01) |
| F04D 29/62 | (2006.01) |
| F04D 29/66 | (2006.01) |
| F16C 17/02 | (2006.01) |
| F04D 29/046 | (2006.01) |

(52) U.S. Cl.
CPC ............ *F04D 13/10* (2013.01); *F04D 29/0462* (2013.01); *F04D 29/0473* (2013.01); *F04D 29/628* (2013.01); *F04D 29/669* (2013.01); *F16C 17/02* (2013.01)

(58) Field of Classification Search
CPC ... F04D 13/0633; F04D 13/08; F04D 13/086; F04D 13/10; F04D 25/0686; F04D 29/04; F04D 29/046; F04D 29/047; F04D 29/05; F04D 29/056; F04D 29/057; F04D 29/0462; F04D 29/0473; F04D 29/628; F04D 29/669; F16C 17/02

USPC .................. 384/91, 95, 97, 98, 129, 290, 295
See application file for complete search history.

(56) References Cited

U.S. PATENT DOCUMENTS

| 7,575,413 | B2 | 8/2009 | Semple et al. |
| 7,987,913 | B2 | 8/2011 | Parmeter et al. |
| 2004/0046295 | A1* | 3/2004 | Rechtien ............. F16C 11/0614 267/140.12 |
| 2010/0102648 | A1* | 4/2010 | Tetzlaff ................... H02K 5/132 310/52 |
| 2011/0070099 | A1* | 3/2011 | Schlenhoff et al. ............ 417/53 |
| 2012/0257985 | A1* | 10/2012 | Parmeter ............... F04D 29/047 417/53 |
| 2012/0263610 | A1 | 10/2012 | Tetzlaff et al. |
| 2014/0127052 | A1* | 5/2014 | Knapp .................... F04D 13/10 417/410.1 |

* cited by examiner

*Primary Examiner* — Justin Jonaitis
*Assistant Examiner* — Christopher Brunjes
(74) *Attorney, Agent, or Firm* — Bracewell, LLP

(57) ABSTRACT

An electrical submersible pump assembly has a rotary pump, an electrical motor, and a seal section. A drive shaft extends from the motor into the pump. A radial bearing for the shaft includes a bearing sleeve secured to the shaft for rotation. A bushing rotatably receives the bearing sleeve in sliding contact. A support member has a receptacle into which the bushing locates. The receptacle has a greater inner diameter than an outer diameter of the bushing, defining an annular gap. A bearing carrier has a bore into which the support member is secured against rotation and radial movement relative to the bearing carrier. A compliant member in the gap in engagement with the bushing and the support member prevents rotation of the bushing relative to the support member and allows limited radial movement of the bushing relative to the bearing carrier.

14 Claims, 3 Drawing Sheets

COMPLIANT RADIAL BEARING FOR ELECTRICAL SUBMERSIBLE PUMP

FIELD OF THE DISCLOSURE

This disclosure relates in general to electrical submersible pumps for wells and in particular to shaft bearings in the pump assemblies that have radial cushioning.

BACKGROUND

Electrical submersible pumps (ESP) are widely used to pump oil production wells. A typical ESP has a rotary pump driven by an electrical motor. A seal section is located between the pump and the motor to reduce the differential between the well fluid pressure on the exterior of the motor and the lubricant pressure within the motor. A drive shaft, normally in several sections, extends from the motor through the seal section and into the pump for rotating the pump. The pump may be a centrifugal pump having a large number of stages, each stage having an impeller and diffuser. The pump may alternately be a progressing cavity pump having a metal rotor with a helical exterior rotated within an elastomeric stator having a double helical interior.

The pump assembly is much longer than its diameter. Shaft or radial bearings are located in the various modules of the pump assembly to support the shaft radially. The radial bearing has a bearing sleeve that is secured by a key to the shaft for rotation therewith. A non rotating bushing has a bore that closely receives the bearing sleeve in rotating, sliding engagement. The bushing is secured in a member that serves as a bearing carrier. In the pump and seal section, the bearing carrier may be secured by a threaded connection to the housing. The bushing may be press-fit into a bore of the bearing carrier. In the motor, the bearing carrier may be an annular member that has elastomeric rings on the exterior. The elastomeric rings frictionally engage an inner diameter of the motor stator to prevent rotation of the bearing carrier.

In some cases, the bushing may be formed of a more wear resistant material, such as tungsten carbide, than the bearing carrier. The wear resistant material is particularly employed for abrasive well fluid applications. It the hard metal bushing is press-fit into the bearing carrier, damage may occur. The wear resistant bushing may misalign slightly when pressed into the bearing carrier. Also, thermal expansion differences between the wear resistant bushing and the bearing carrier may create problems.

SUMMARY

An electrical submersible pump assembly includes a rotary pump, an electric motor, and a seal section connected between the rotary pump and the electrical motor. A drive shaft extends along a longitudinal axis from the motor through the seal section and into the pump for driving the pump. At least one radial bearing in the pump, the seal section, or the motor has a bearing sleeve secured to the shaft for rotation therewith. A bushing has a bore that rotatably receives the bearing sleeve in sliding contact, the bushing being formed of an abrasion resistant material. A support member has a bore into which the bushing locates, the bore of the support member having a greater inner diameter than an outer diameter of the bushing, defining an annular gap. The support member is formed of a material having less hardness than the material of the bushing. A compliant member in the gap is in engagement with the bushing and the support member, preventing rotation of the bushing relative to the support member and allowing limited radial movement of the bushing relative to the support member.

In one embodiment, a bearing carrier is rigidly mounted in the pump, the seal section, or the motor. The support member is press fit into a bore of the bearing carrier. The compliant member is resilient and may be formed of an elastomeric material. The compliant member may comprise an upper elastomeric ring bonded between the bushing and the support member at an upper end of the annular gap, and a lower elastomeric ring bonded between the bushing and the support member at a lower end of the annular gap.

DETAILED DESCRIPTION OF THE DISCLOSURE

Figure 1:
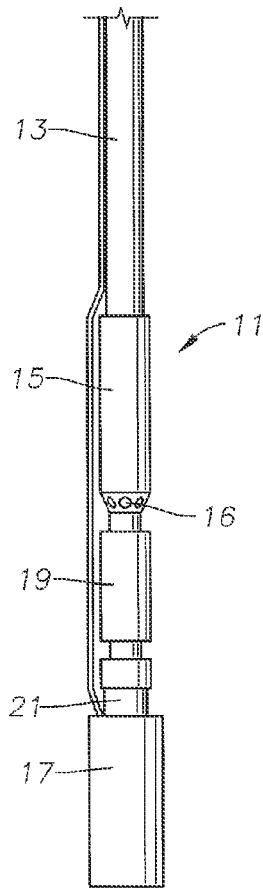
FIG. 1 is a side view of an electrical pump assembly in accordance with this disclosure.

Referring to FIG. 1, electrical submersible pump assembly (ESP) 11 is illustrated as being supported on production tubing 13 extending into a well. Alternately, ESP 11 could be supported by other structure, such as coiled tubing. ESP 11 includes several modules, one of which is a rotary pump 15 that is illustrated as being a centrifugal pump. Pump 15 has an intake 16 for drawing in well fluid. Alternately, pump 15 could be other types, such as a progressing cavity pump. Another module is an electrical motor 17, which drives pump 15 and is normally a three-phase AC motor. A third module comprises a protective member or seal section 19 coupled between pump 15 and motor 17. Seal section 19 has components to reduce a pressure differential between dielectric lubricant contained in motor 17 and the pressure of the well fluid on the exterior of ESP 11. Intake 16 may be located in an upper portion of seal section 19 or on a lower end of pump 15. A thrust bearing unit 21 for motor 17 may be a separate module, or it may be located within the seal section 19 or motor 17. ESP 11 may also include other modules, such as a gas separator for separating gas from the well fluid prior to the well fluid flowing into pump 15. The various modules may be shipped to a well site apart from each other, then assembled with bolts or other types of fasteners.

Figure 2:
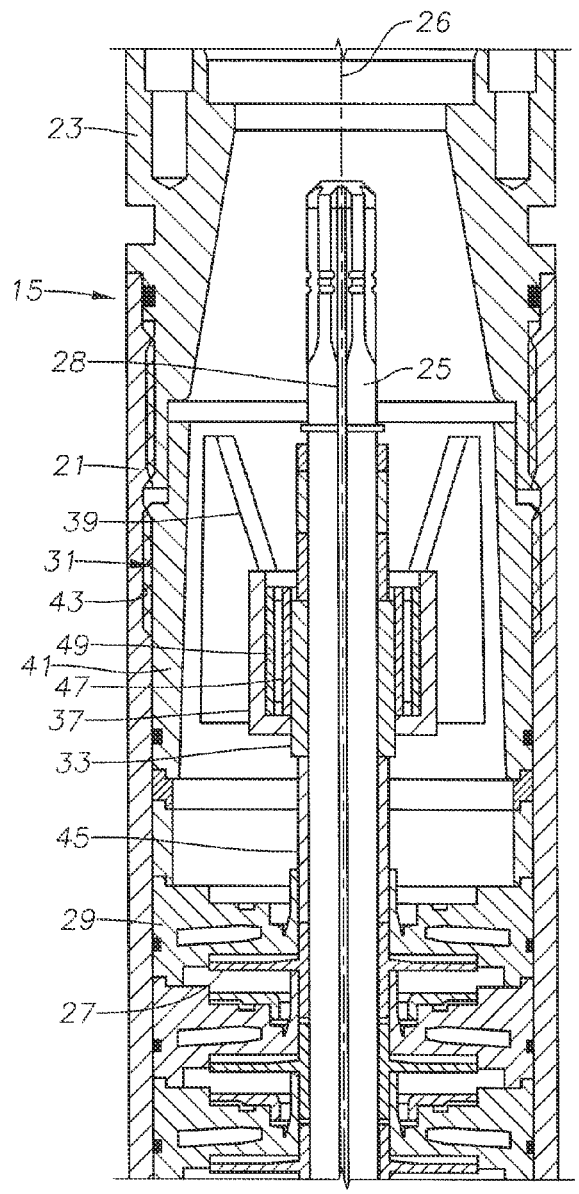
FIG. 2 is a sectional view of an upper portion of the pump of FIG. 1.

Referring to FIG. 2, pump 15 has a cylindrical housing 21 that is much smaller in diameter than a length of pump 15. An adapter 23 secures to housing 21 by threads and connects housing 21 to either another pump (not shown) or to production tubing 13. A shaft 25 extends along a longitudinal axis from motor 17, through seal section 19 and through pump 15. Shaft 25 is normally made up of separate sections in each module, the sections connected by splined couplings.

In this example, pump 15 has a large number of stages, each stage including an impeller 27 and a diffuser 29. Impellers 27 are secured to shaft 25 by a key 28 for rotation therewith. Diffusers 29 are fixed in housing 21 by various conventional techniques to prevent rotation. FIG. 2 illustrates a radial flow pump, wherein the fluid discharged from each impeller 27 is primarily in a radial direction. Pump 15 could alternately be a mixed flow type that discharges fluid in a direction having radial and axial components.

A top shaft or radial bearing 31 is located above the impellers 27 and diffusers 29 for radially supporting and stabilizing shaft 25. A similar radial or shaft bearing (not shown) is located at the lower end of pump 15 below impellers 27 and diffusers 29. Radial bearing 31 includes a bearing sleeve 33 that is a cylindrical member secured around shaft 25. Key 28 engages a keyway in bearing sleeve 33 to cause bearing sleeve 33 to rotate with shaft 25. Bearing sleeve 33 may be formed of various steels or a harder, more wear resistant material such as tungsten carbide. Radial bearing 31 also has a bearing carrier that includes an inner cylinder 37 secured by radially extending webs 39 to an outer cylinder 41. Inner cylinder 37 and outer cylinder 41 are concentric relative to axis 26 and define a flow passage between them for well fluid to flow. Alternately, inner and outer bearing carrier cylinders 39, 41 could be a single member with well fluid flow passages formed through it. Bearing carrier outer cylinder 41 is rigidly mounted within the interior of pump housing 21, such as by threads 43. Bearing carrier inner cylinder 37 thus is non rotating and rigidly mounted in housing 21. Spacer sleeves 45 may surround shaft 25 above and below radial bearing 31 to reduce erosion of shaft 25 due to abrasive well fluid. Spacer sleeves 45 may be of a harder, more abrasion resistant material than shaft 25, such as tungsten carbide.

Figure 3:
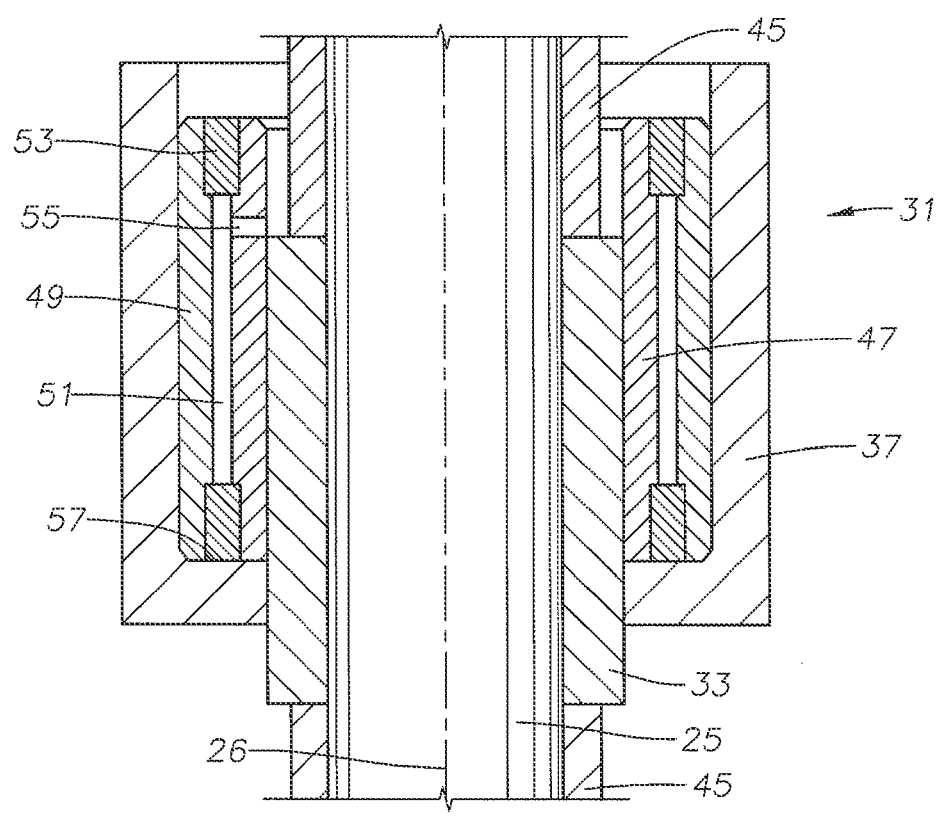
FIG. 3 is an enlarged view of part of the shaft bearing illustrated in FIG. 2.

Referring to FIG. 3, radial bearing 31 includes a non rotating inner bushing 47 that may be formed of an abrasion resistant material, such as tungsten carbide. Inner bushing 47 closely receives bearing sleeve 33 in sliding, rotational contact. The wall thickness of inner bushing 47 may be the same or less than the wall thickness of bearing sleeve 33. The length of inner bushing 47 is illustrated as being less than the length of bearing sleeve 33, but it could be the same. A portion of inner bushing 47 extends above the upper end of bearing sleeve 33 in this example, but they could be flush with each other.

Inner bushing 47 is mounted within the bore of a support member or outer bushing 49. The bore of support bushing 49 is larger in inner diameter than the outer diameter of inner bushing 47, resulting in an annular gap 51 between them. The radial width of gap 51 can vary, for example, between 0.020 to 0.100 inch. Because of the rotating, sliding engagement, there is a slight difference between the inner diameter of inner bushing 47 and the outer diameter of bearing sleeve 33, but this difference is much smaller than the width of gap 51, such as 0.005 inch on a side. Gap 51 is sufficiently wide to allow slight radial movement of inner bushing 47 relative to support bushing 49. Support bushing 49 and inner bushing 47 may have the same axial dimension, as shown. Support bushing 49 is preferably formed of a softer material than the material of inner bushing 47, such as steel. Support bushing 49 may be formed of the same material or a different material than bearing carrier inner cylinder 37.

A compliant member, preferably upper and lower elastomeric rings 53, extends across gap 51. Compliant rings 53 are preferably located at the upper and lower ends of gap 51. Compliant rings 53 are resilient to allow limited radial movement of inner bushing 47 relative to support bushing 49, and may be formed of a rubber material. Compliant rings 53 also serve an anti-rotation members to prevent inner bushing 47 from rotating. In this embodiment, each compliant ring 53 is bonded or cured to the outer diameter of inner bushing 47 and to the inner diameter of support bushing 49. A single, elastomeric member of the same axial dimension as inner and outer bushings 47, 49 may also be suitable, rather than two separate compliant rings 53. Breather holes 55 may be formed in inner bushing 47 to admit well fluid into the annular gap 51. In the example shown, one of the breather holes 55 is located near and just below the upper compliant ring 53, and another located near and just above the lower compliant ring 53. The upper breather hole 55 is illustrated as leading to a point above the upper end of bearing sleeve 33 so as to admit well fluid into gap 51.

Support bushing 49 is rigidly secured inside the bore of bearing carrier inner cylinder 37. Support bushing 49 is not radially movable or rotatable relative to bearing carrier inner cylinder 37. The preferred method of securing support bushing 49 in bearing carrier inner cylinder 37 is by an interference or press-fit. The operator forces support bushing 49 into bearing carrier inner cylinder 37 after compliant rings 53 are bonded to inner bushing 47. In this technique, the initial outer diameter of support bushing 49 is slightly greater than the initial inner diameter of bearing carrier inner cylinder 37. An upward facing shoulder 57 may be formed in the bore of bearing carrier inner cylinder 37 to serve as a stop for support bushing 49.

In the operation of the embodiment of FIGS. 1-3, motor 17 rotates shaft 25, causing impellers 27 to rotate and pump fluid upward. Radial bearing sleeve 33 rotates with shaft 25 inside of inner bushing 47. Support bushing 49 and bearing carrier cylinders 37, 41 remain non rotating. Gap 51 and compliant rings 53 allow slight radial movement between inner bushing 47 and support bushing 49. Since inner bushing 47 is not press-fit into any receptacle, damage to inner bushing 47 during installation is not likely even though inner bushing 47 may be of a hard wear resistant material. The softer material of support bushing 49 than inner bushing 47 makes it more amenable to being press fit into bearing carrier inner cylinder 37 than a hard wear resistant material.

Figure 4:
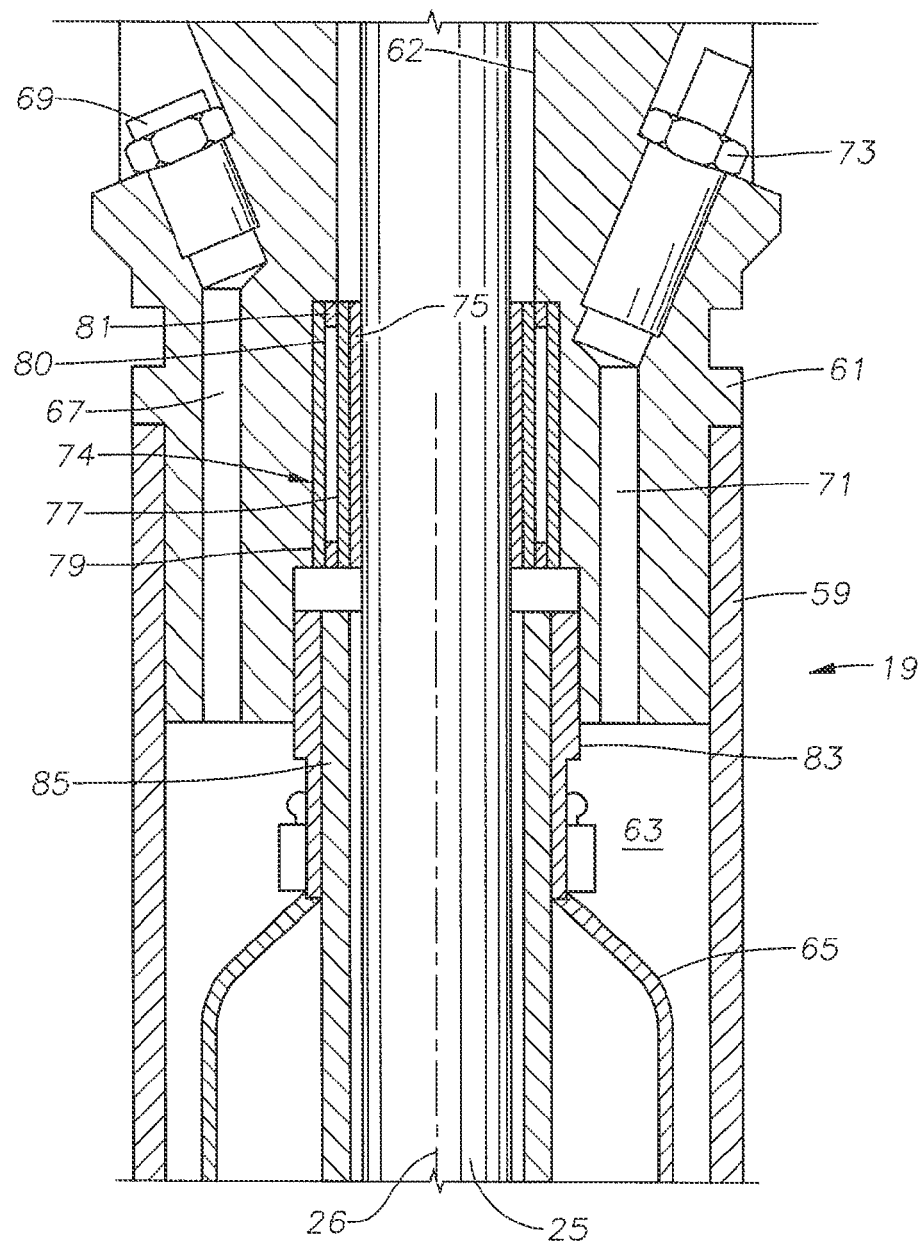
FIG. 4 is a sectional view of an upper portion of the seal section of FIG. 1.

Referring to FIG. 4, a portion of seal section 19 shows that similar shaft bearings to radial bearing 31 may be employed. Seal section 19 has a housing 59 with an upper connector 61 secured to it. Shaft 25 extends through a passage 62 in upper connector 61 that is larger in diameter than shaft 25. Upper connector 61 connects to pump 15 (FIG. 1) and may include pump intake 16. Seal section 19 has an equalizing chamber 63 with a bladder 65 to reduce a pressure differential between well fluid and dielectric lubricant contained in motor 17 (FIG. 1). In FIG. 4, the dielectric lubricant is in the interior of bladder 65 and well fluid on the exterior. An inlet 67 admits well fluid passing through a check valve 69 into equalizing chamber 63. Bladder 65 may be elastomeric or metal, such as a metal bellows. Alternately, a labyrinth of tubes (not shown) may be used to retard well fluid in equalizing chamber 63 from migrating downward to motor 17. An outlet port 71 and pressure relief valve 73 allow well fluid to be expelled from equalizing chamber 63 in the event of overpressure due to heat.

The top radial or shaft bearing 74 in seal section 19 is located in upper connector 61. A similar radial bearing will be located at the lower end of seal section 19. Also, if seal section 19 has multiple bladders 65 in series or tandem (not shown), similar radial bearings will be located at the various connectors between the chambers containing the other bladders. Radial bearing 74 includes a bearing sleeve 75 that rotates in unison with shaft 25 due to a key and keyway. A non rotating inner bushing 77 closely receives bearing sleeve 75 in rotating and sliding engagement. An outer or support bushing 79 surrounds inner bushing 77 and is separated by an annular gap 80. Upper and lower compliant rings 81, preferably of elastomeric material, are bonded between the outer diameter of inner bushing 77 and the inner diameter of support bushing 79. Compliant rings 81 prevent inner bushing 77 from rotating and allow limited radial movement of inner bushing 77 relative to support bushing 79. Inner bushing 79 may be of a harder, more abrasion resistant material than support bushing 79.

The bearing carrier in this instance comprises upper connector 61. In the preferred technique, the operator presses support bushing 79 into the bore of upper connector 61 with an interference fit. The pressing occurs after inner bushing 77 has been bonded to support bushing 79 with compliant rings 81. A conventional seal 83 seals between a tube 85 surrounding shaft 25 and the lower end of shaft passage 62. Seal 83 will prevent well fluid contained in equalizing chamber 63 from reaching radial bearing 74. Dielectric lubricant from motor 17 is contained in the annulus between shaft 25 and tube 85, and that lubricant will enter shaft passage 62 and immerse radial bearing 74. A mechanical face seal (not shown) is conventionally mounted around shaft 25 at the upper end of shaft passage 62. Some leakage of well fluid past the mechanical face seal into passage 62 is expected, thus radial bearing 74 is likely to be in some contact with well fluid.

In the operation of the embodiment of FIG. 4, motor 17 (FIG. 1) rotates shaft 25, which causes bearing sleeve 75 to rotate with it. Support bushing 79 prevents inner bushing 77 from rotating and allows limited radial movement of inner bushing 77 relative to support bushing 79.

While the disclosure has been shown in only two of its forms, it should be apparent to those skilled in the art that it is not so limited, but is susceptible to various changes without departing from the scope of the disclosure. The radial compliance provided by the compliant rings could be employed within other portions of the submersible pump assembly, such as in the pump stages and in the motor.

The invention claimed is:

1. An electrical submersible pump assembly for a well, comprising:
   a rotary pump, an electric motor, and a seal section connected between the rotary pump and the electrical motor;
   a drive shaft extending along a longitudinal axis from the motor through the seal section and into the pump for driving the pump;
   at least one bearing in at least one of the pump, the seal section, and the motor, comprising:
   a bearing sleeve secured to the shaft for rotation therewith;
   a bushing having a bore that rotatably receives the bearing sleeve in sliding contact, the bushing being formed of an abrasion resistant material;
   a support member non rotatably mounted in said one of the pump, the seal section, and the motor, the support member having a bore into which the bushing locates, the bore of the support member having a greater inner diameter than an outer diameter of the bushing, defining an annular gap, the support member being formed of a material having less hardness than the material of the bushing;
   a compliant member in the annular gap in engagement with the bushing and the support member, preventing rotation of the bushing relative to the support member and allowing limited radial movement of the bushing relative to the support member;
   a bearing carrier having a bore and rigidly mounted in said one of the pump, the seal section, and the motor; wherein
   an initial outer diameter of the support member is greater than an inner diameter of the bore of the bearing carrier, defining an interference fit of the support member in the bore of the bearing carrier;
   the bushing and the support member have axial lengths that are the same, with upper ends that are axially aligned with each other and lower ends that are axially aligned with each other;
   the compliant member comprises:
   an upper elastomeric ring bonded to the outer diameter of the bushing and to the inner diameter of the bore of the support member at the upper ends of the bushing and the support member;
   a lower elastomeric ring bonded to the outer diameter of the bushing and to the inner diameter of the bore of the support member at the lowers ends of the bushing and the support member; wherein
   the upper elastomeric ring has an upper side axially aligned with the upper ends of the bushing and the support member; and
   the lower elastomeric ring has a lower side axially aligned with the lower ends of the bushing and the support member.

2. The pump assembly according to claim 1, wherein the bearing is located in the pump.

3. The pump assembly according to claim 1, wherein the bearing carrier comprises a connector on one end of one of the modules for connecting said one of the modules to another of the modules.

4. The pump assembly according to claim 1, wherein the annular gap has a larger width than a clearance between an inner diameter of the bushing and an outer diameter of the bearing sleeve.

5. The pump assembly according to claim 1, wherein the annular gap has a radial width in a range between 0.20 to 0.100 inch.

6. The pump assembly according to claim 1,
   the bearing carrier has a shoulder with an upward facing surface engaged by lower ends of the bushing and the support member.

7. The pump assembly according to claim 1, wherein:
   the pump has a plurality of stages located within a housing, each stage having an impeller and a diffuser; and
   wherein the bearing comprises a radial bearing in the housing axially spaced from the stages.

8. An electrical submersible pump assembly, comprising:
   a plurality of modules including a rotary pump module, an electrical motor module, and a seal section module connected between the rotary pump module and the electrical motor module;
   a drive shaft extending along a longitudinal axis from the motor module into the pump module for driving the pump module;
   at least one radial bearing in at least one of the modules for providing radial support of the shaft, comprising:
   a bearing sleeve secured to the shaft for rotation therewith;
   a bushing having a bore that rotatably receives the bearing sleeve in sliding contact;
   a support member having a receptacle into which the bushing locates, the receptacle having a greater inner diameter than an outer diameter of the bushing, defining an annular gap;
   a bearing carrier stationarily mounted in the housing of said one of the modules, the bearing carrier having a bore into which the support member is secured against rotation and radial movement relative to the bearing carrier;
   a flexible compliant member in the annular gap, the compliant member having an inner diameter bonded to the outer diameter of the bushing and an outer diameter bonded to the receptacle of the support member, preventing rotation of the bushing relative to the support member and allowing limited radial movement of the bushing relative to the bearing carrier; wherein the annular gap has a larger width than a clearance between the bore of the bushing and an outer diameter of the bearing sleeve;

the bushing and the support member have axial lengths that are the same, with upper ends that are axially aligned with each other and lower ends that are axially aligned with each other;

the compliant member comprises:

an upper elastomeric ring bonded to the outer diameter of the bushing and to the inner diameter of the receptacle of the support member at the upper ends of the bushing and the support member;

a lower elastomeric ring bonded to the outer diameter of the bushing and to the inner diameter of the receptacle of the support member at the lowers ends of the bushing and the support member; wherein the upper elastomeric ring has an upper side in axial alignment with the upper ends of the bushing and the support member; and the lower elastomeric ring has a lower side in axial alignment with the lower ends of the bushing and the support member.

9. The pump assembly according to claim 8, wherein:

the annular gap has a radial width in a range between 0.20 to 0.100 inch.

10. The pump assembly according to claim 8, wherein:

a vent hole extends through the bushing from the bore of the bushing to the outer diameter of the bushing and into the annular gap at a point between the upper elastomeric ring and the lower elastomeric ring.

11. The pump assembly according to claim 8, wherein the radial bearing is located in at least one of the pump module and the seal section module.

12. An electrical submersible pump assembly or a well, comprising:

a rotary pump driven by an electrical motor, the pump having a plurality of stages, each of the stages having an impeller and a diffuser;

a drive shaft extending along a longitudinal axis from the motor into the pump, the impellers being mounted to the shaft for rotation therewith;

a radial bearing in the pump and axially spaced from the stages for providing radial support of the shaft, comprising:

a bearing sleeve secured to the shaft for rotation therewith;

a bushing having a bore that rotatably receives the bearing sleeve in sliding contact;

a support member having a bore into which the bushing locates, the bore of the support member having a greater inner diameter than an outer diameter of the bushing, defining an annular gap, the support member having less hardness than the bushing;

a bearing carrier stationarily mounted in the pump, the bearing carrier having a bore with an inner diameter less than an initial outer diameter of the support member, defining an interference fit between the support member and the bearing carrier;

the bushing and the support member having upper ends that are axially aligned with each other and lower ends that are axially aligned with each other;

an upper elastomeric member in the annular gap bonded with the outer diameter of the bushing and the bore of the support member at the upper ends of the bushing and the support member;

a lower elastomeric member in the annular gap bonded with the outer diameter of the bushing and the bore of the support member at the lower ends of the bushing and the support member, the upper and lower elastomeric members preventing rotation of the bushing relative to the support member and allowing limited radial movement of the abrasion resistant bushing relative to the support member; wherein the annular gap has a larger width than a clearance between the bore of the bushing and an outer diameter of the bearing sleeve;

the upper elastomeric member has an upper end flush with the upper ends of the bushing and the support member; and the lower elastomeric member has a lower end flush with the lower ends of the bushing and the support member.

13. The pump assembly according to claim 12, wherein the annular gap has a radial width in a range between 0.20 to 0.100 inch.

14. The pump assembly according to claim 12, further comprising:

a seal section located between the pump and the motor, a portion of the shaft passing through the seal section, the seal section having an interior portion in fluid communication with well fluid, the seal section having a bladder that separates the well fluid from a dielectric fluid contained in the seal section and the motor;

a radial bearing in the seal section for providing radial support of the portion of the shaft passing through the seal section, comprising:

a seal section bearing sleeve secured to the shaft for rotation therewith;

an inner bushing having a bore that rotatably receives the seal section bearing sleeve in sliding contact;

an outer bushing having a bore into which the inner bushing locates, the bore of the outer bushing having a greater inner diameter than an outer diameter of the inner bushing, defining an annular gap;

a seal section bearing carrier stationarily mounted in the seal section, the seal section bearing carrier having a bore into which the outer bushing is press-fit; and at least one elastomeric member secured in the annular gap between the inner bushing and the outer bushing, preventing rotation of the inner bushing relative to the outer bushing and allowing limited radial movement of the inner bushing relative to the outer bushing.

* * * * *

UNITED STATES PATENT AND TRADEMARK OFFICE
CERTIFICATE OF CORRECTION

| | | |
|---|---|---|
| PATENT NO. | : 9,303,648 B2 | Page 1 of 1 |
| APPLICATION NO. | : 13/932616 | |
| DATED | : April 5, 2016 | |
| INVENTOR(S) | : John J. Mack | |

It is certified that error appears in the above-identified patent and that said Letters Patent is hereby corrected as shown below:

Claims

Column 6, line 33, claim 6, after "claim 1," insert --wherein--

Signed and Sealed this
Seventh Day of June, 2016

Michelle K. Lee
*Director of the United States Patent and Trademark Office*